United States Patent
Jia

(10) Patent No.: US 9,806,990 B2
(45) Date of Patent: Oct. 31, 2017

(54) FAST RECOVERY METHOD AND DEVICE FOR STP-BASED BACKUP PORT

(71) Applicant: ZTE Corporation, Shenzhen, Guangdong (CN)

(72) Inventor: Shurui Jia, Shenzhen (CN)

(73) Assignee: XI'AN ZHONGXING NEW SOFTWARE CO.LTD., Xi'An (CN)

( * ) Notice: Subject to any disclaimer, the term of this patent is extended or adjusted under 35 U.S.C. 154(b) by 22 days.

(21) Appl. No.: 14/652,863

(22) PCT Filed: Aug. 29, 2013

(86) PCT No.: PCT/CN2013/082603
§ 371 (c)(1),
(2) Date: Jun. 17, 2015

(87) PCT Pub. No.: WO2013/189456
PCT Pub. Date: Dec. 27, 2013

(65) Prior Publication Data
US 2015/0341256 A1 Nov. 26, 2015

(30) Foreign Application Priority Data
Dec. 19, 2012 (CN) .......................... 2012 1 0553144

(51) Int. Cl.
*H04L 12/26* (2006.01)
*H04L 12/707* (2013.01)
(Continued)

(52) U.S. Cl.
CPC .............. *H04L 45/22* (2013.01); *H04L 45/28* (2013.01); *H04L 45/48* (2013.01); *H04L 49/30* (2013.01)

(58) Field of Classification Search
None
See application file for complete search history.

(56) References Cited

U.S. PATENT DOCUMENTS 6,032,194 A 2/2000 Gai
6,388,995 B1 5/2002 Gai
(Continued)

FOREIGN PATENT DOCUMENTS

| CN | 101771705 A | 7/2010 |
| CN | 103067274 A | 4/2013 |
| EP | 2256995 A2 | 12/2010 |

OTHER PUBLICATIONS

Supplementary European Search Report in European application No. 13807157.6, dated Dec. 18, 2015.
(Continued)

*Primary Examiner* — Phirin Sam
(74) *Attorney, Agent, or Firm* — Oppedahl Patent Law Firm LLC

(57) ABSTRACT

Disclosed is a fast recovery method for a Spanning Tree Protocol (STP) based backup port, and the method includes: it is detected that a failure occurs on a port of an STP-based device; and it is determined whether there is a backup port taking a failed port as a master port, and when it is determined that there is such a backup port, said backup port is changed to a master port; further disclosed is a fast recovery device for an STP based backup port. By means of the technical solutions of the disclosure, it is possible to shorten significantly recovery time of a backup port, and improve greatly performance of link recovery.

4 Claims, 3 Drawing Sheets

(51) Int. Cl.
*H04L 12/935* (2013.01)
*H04L 12/703* (2013.01)
*H04L 12/753* (2013.01)

(56) References Cited

U.S. PATENT DOCUMENTS

| | | |
|---|---|---|
| 6,535,491 B2 | 3/2003 | Gai |
| 6,976,088 B1 | 12/2005 | Gai |
| 7,848,264 B1 | 12/2010 | Gai |
| 2002/0052936 A1 | 5/2002 | Gai |
| 2002/0147800 A1 | 10/2002 | Gai |
| 2003/0043736 A1* | 3/2003 | Gonda ............... H04J 3/14 370/218 |
| 2006/0171302 A1 | 8/2006 | Tallet |
| 2008/0259786 A1* | 10/2008 | Gonda ............... H04J 3/14 370/218 |
| 2011/0258346 A1* | 10/2011 | Said ............... H04L 45/00 709/249 |
| 2012/0281524 A1* | 11/2012 | Farkas ............... H04L 45/00 370/221 |
| 2013/0232277 A1* | 9/2013 | Williams ............... H04L 45/22 709/239 |

OTHER PUBLICATIONS

International Search Report in international application No. PCT/CN2013/082603, dated Dec. 5, 2013.
English Translation of the Written Opinion of the International Search Authority in international application No. PCT/CN2013/082603, dated Dec. 5, 2013.

* cited by examiner

FAST RECOVERY METHOD AND DEVICE FOR STP-BASED BACKUP PORT

TECHNICAL FIELD

The disclosure relates to the technical field of communications, and in particular to a fast recovery method and device for a Spanning Tree Protocol (STP) based backup port.

BACKGROUND

At present, with the popularity of networks, users have increasing high requirements on reliability of networks, thus for important network connections, it is a commonly used method to provide backup links.

In a two-layer network, provision of backups for important network connections results in a loop in physical connections of the network, thereby leading to a broadcast storm, and a Spanning Tree Protocol (STP) is used to eliminate the loop in the two-layer network.

The topology of a whole network is shaped in a tree-shaped structure through blocking of redundant links by the STP so that there is only one link between any two points during communication, avoiding generation of a broadcast storm; and when a failure occurs on a link, blocked redundant links can be automatically recovered and used for forwarding, thus achieving the purpose of link backup.

In the prior art, when a failure occurs on a master port indirectly connected with a backup port (there are other devices connected therebetween, messages of a Bridge Protocol Data Unit (BPDU) are transmitted through these devices), no relevant fast recovery mechanism has been established in corresponding standards, what can be done is only to wait until message information of the backup reaches its maximum age (Maxage).

For example, as shown in FIG. 1 that shows a typical application scenario when a backup port is taken as a link backup, a Customer Edge (CE) device is connected with different Provider Edge (PE) devices, and a Rapid Spanning Tree Protocol (RSTP) or a Multiple Spanning Tree Protocol (MSTP) runs on the CE device, PE 1 and PE 2 receive STP BPDU messages, the BPDU messages are transmitted between provider networks through Pseudo Wires (PWs), thus achieving an effect as if port 1 and port 2 of the CE device are directly connected; when the network is normal, port 2 serves as a backup port and is in a blocked state.

When the master port of the CE device, i.e., port 1 fails, port 2 serving as a backup port cannot detect the failure and can only wait until BPDU message information reaches its maxage, then only after twice time of forward delays, port 2 can forward, thus time taken for port recovery is about 50 s, and it is not acceptable for network users to suffer disconnection of that long.

SUMMARY

In view of the above, embodiments of the disclosure are intended to provide a fast recovery method and device for an STP-based backup port so as to solve the problem in the prior art that port recovery can be performed only after waiting until message information of the backup port reaches its maxage and the recovery time is relatively long.

The main purpose of the embodiments of the disclosure is achieved through below technical solutions.

A fast recovery method for an STP-based backup port, including:

it is detected that a failure occurs on a port of an STP-based device; and it is determined whether there is a backup port taking a failed port as a master port, and when it is determined that there is such a backup port, said backup port is changed to a master port.

In the above solution, the method may further include: after said backup port is changed to a master port, the state of the master port is set to a forwarding state.

In the above solution, the method may include:
when it is detected that a failure occurs on a port of an STP-based device, a port Identity (ID) of a failed port is recorded.

In the above solution, the step that it is determined whether there is a backup port taking a failed port as a master port may include:

it is determined whether in a port priority vector there is a port having a specified port field, i.e., port ID that is the same as the ID of the failed port, and when it is determined that there is such a port, said port is determined as the backup port taking the failed port as a master port.

In the above solution, the method may include:
it is determined whether there is one or multiple backup ports taking the failed port as a master port; and
when it is determined that there are multiple such backup ports, a backup port having a highest priority is selected as a backup port of the failed port.

The embodiments of the disclosure further provide A fast recovery device for an STP-based backup port, and the device include:

a detection unit configured to, when detecting that a failure occurs on a port of an STP-based device, trigger a determination unit;

the determination unit configured to determine whether there is a backup port taking a failed port as a master port, and when it is determined that there is such a backup port, trigger a processing unit; and the processing unit configured to change said backup port to a master port.

In the above solution, the processing unit is further configured to, after said backup port is changed to a master port, set the state of the master port to a forwarding state.

In the above solution, the detection unit is configured to, when it is detected that a failure occurs on a port of an STP-based device, record a port Identity (ID) of the failed port In the above solution, the determination unit may be configured to:

determine whether in a port priority vector there is a port having a specified port field, i.e., port ID that is the same as the ID of the failed port, and when it is determined that there is such a port, determine said port as the backup port taking the failed port as a master port and trigger the processing unit.

In the above solution, the determination unit may be further configured to determine whether there is one or multiple backup ports taking the failed port as a master port, and when it is determined that there are multiple such backup ports, select a backup port having a highest priority as a backup port of the failed port and trigger the processing unit.

Beneficial effects of embodiments of the disclosure are as follows.

The embodiments of the disclosure can shorten significantly recovery time of a backup port, and improve greatly performance of link recovery.

Other features and advantages of the embodiments of the disclosure will be described later in the specification, and

DETAILED DESCRIPTION

Preferred embodiments of the disclosure will be described below with reference to accompanying drawings, the drawings consist part of the present application and are used together with embodiments of the disclosure to explain the principle of the disclosure. It should be understood that the specific embodiments are only used to interpret the disclosure instead of limiting the disclosure. It should be noted that embodiments of the disclosure and features in the embodiments can be combined with each other in case of no conflicts.

Figure 1:
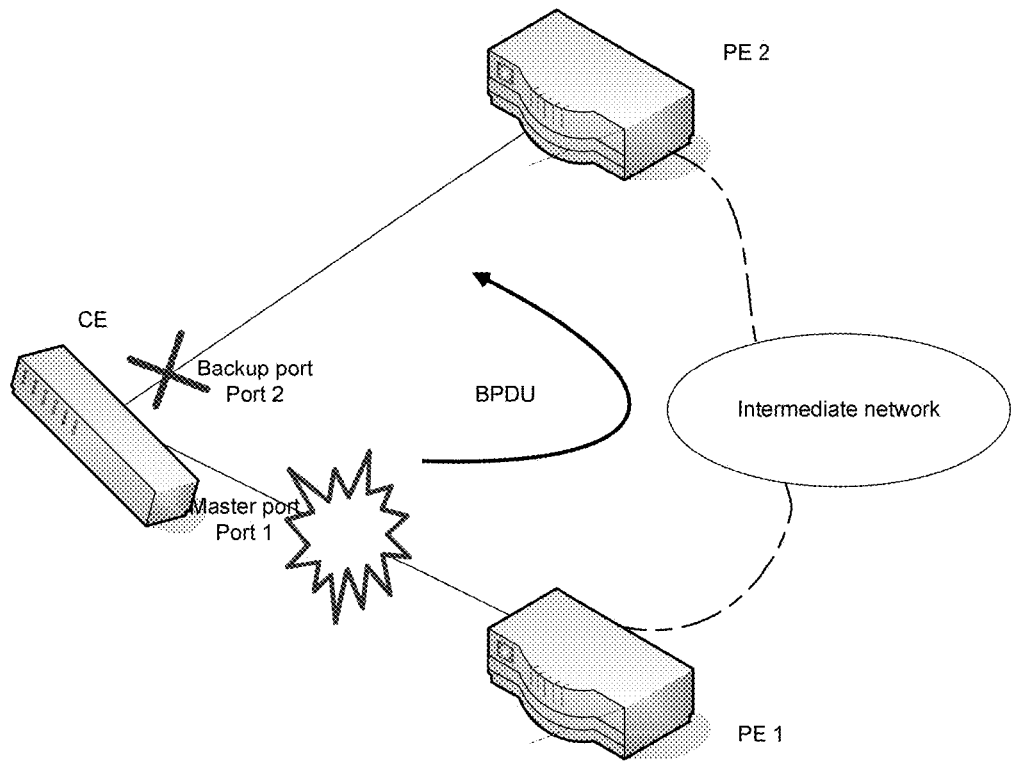
FIG. 1 is a schematic diagram showing a typical application scenario when a backup port is taken as a link backup.
Figure 2:
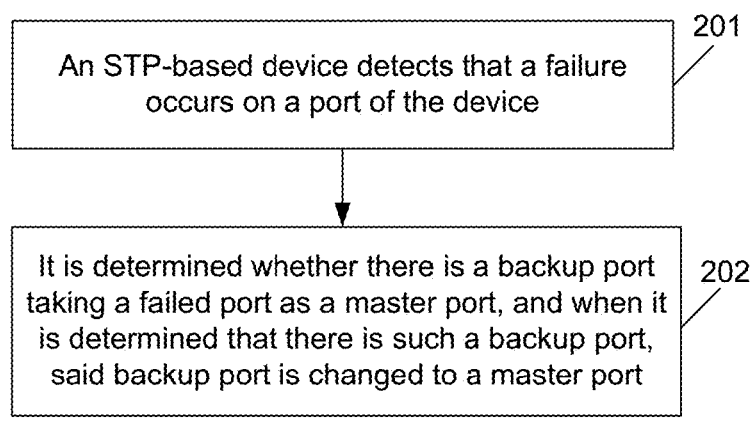
FIG. 2 is a flow chart of a fast recovery method for an STP-based backup port according to an embodiment of the disclosure.
Figure 3:
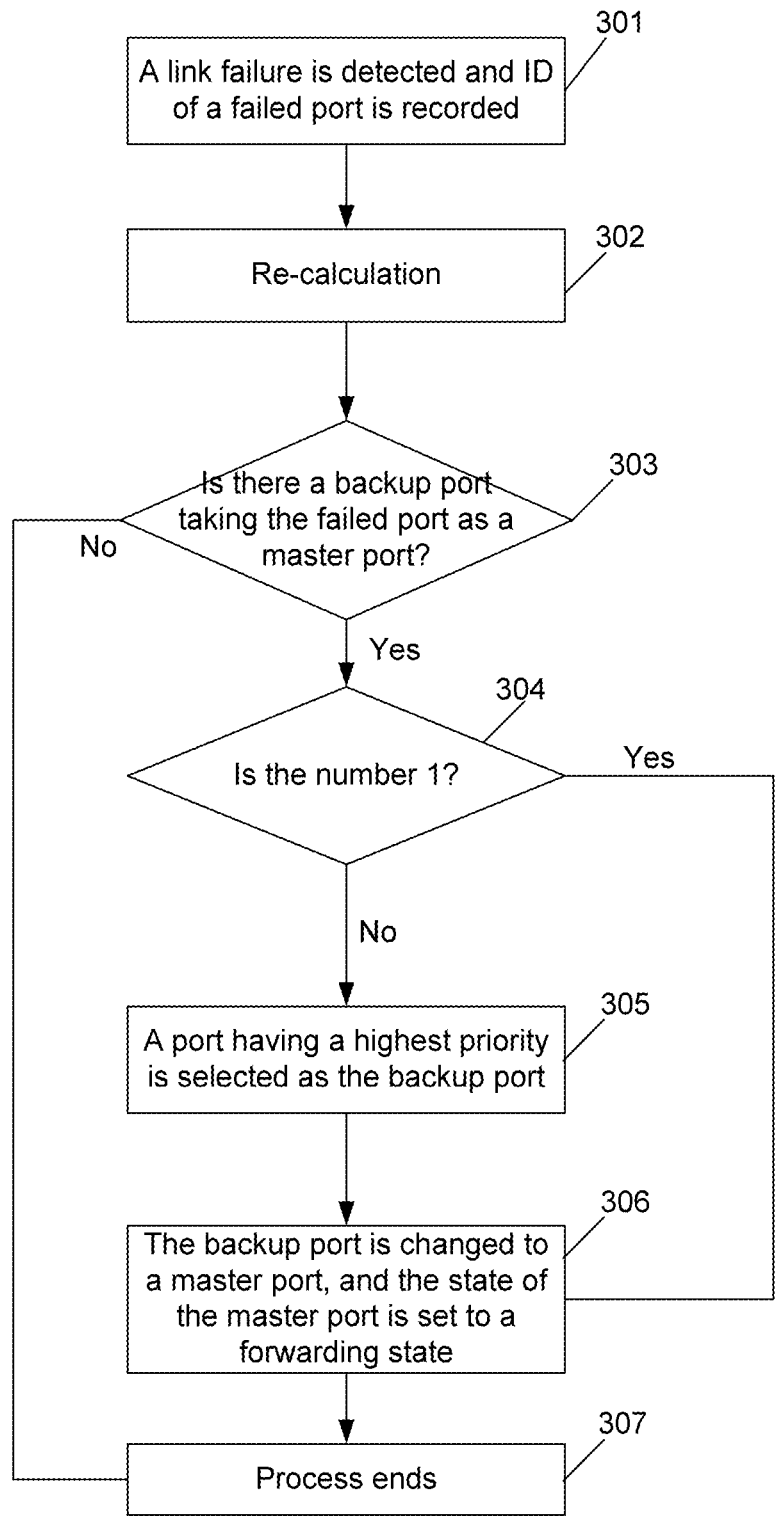
FIG. 3 is a schematic diagram showing a specific embodiment of a fast recovery method for an STP-based backup port.

Firstly, the fast recovery method for an STP-based backup port according to an embodiment of the disclosure will be elaborated with reference to FIGS. 1 to 3.

As shown in FIG. 2 that is a flow chart of a fast recovery method for an STP-based backup port according to the embodiment of the disclosure, the method specifically includes the following steps:

step 201, an STP-based device detects that a failure occurs on a port of the device; and step 202, it is determined whether there is a backup port taking a failed port as a master port, and when it is determined that there is such a backup port, said backup port is changed to a master port.

The embodiment takes a scenario shown in FIG. 1 as an example, where an CE is connected with different PEs, the CE runs the RSTP or MSTP.

As shown in FIG. 3 that is a schematic diagram showing a specific embodiment of a fast recovery method for an STP-based backup port, the method may specifically include:

step 301, the CE detects that port 1 of a device fails, and records a port identity (port_ID) of the port;

step 302, the port failure results in re-calculation of spanning tree;

step 303, respective ports of the CE are traversed to determine whether there is a backup port taking the failed port 1 as a master port, specifically, it is determined whether in a port priority vector there is a port having a specified port field, i.e., port_ID that is the same as the port_ID recorded in step 301, if there is, the port having the same port_ID as the port_ID recorded in step 301 is determined as the backup port taking the failed port 1 as a master port, then proceed to step 304; if there is not such a port, proceed to step 307;

step 304, the number of backup ports taking the failed port 1 as a master port is acquired to determine whether there is one or multiple such backup ports, if there are multiple, proceed to step 305, otherwise, proceed to step 306;

step 305, when there are multiple backup ports taking the failed port 1 as a master port, then a port having a highest priority is selected, according to a priority rule in the port priority vector, as a backup port of the failed port 1;

step 306, the only backup port determined in step 304 or the backup port having a highest priority selected in step 305 is changed to a specified port, i.e., the original backup port is specified as master port, and the state of the master port is set to a forwarding state; and step 307, the process ends.

It should be noted that the above embodiment of the method is described only in a networking environment where a CE is dual homed to PEs, and the fast recovery mechanism of the backup port is also applied to fast recovery scenario that takes other ports as a backup. For example, a scenario where a hub or a switch having an STP message transmission function is used to connect indirectly two ports of a switch.

Figure 4:
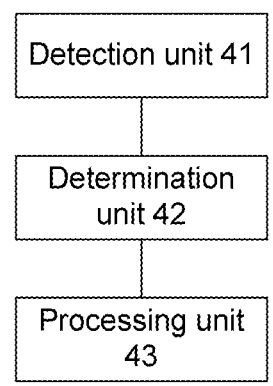
FIG. 4 is a schematic structural diagram of a fast recovery device for an STP-based backup port according to an embodiment of the disclosure.

Then, the fast recovery device for an STP-based backup port according to an embodiment of the disclosure will be elaborated with reference to FIG. 4.

As shown in FIG. 4 that is a schematic structural diagram of a fast recovery device for an STP-based backup port according to an embodiment of the disclosure, the device specifically includes a detection unit 41, a determination unit 42 and a processing unit 43, and respective functional units will be elaborated below.

The detection unit 41 is configured to, when detecting that a failure occurs on a port of an STP-based device, trigger the determination unit 42;

the determination unit 42 is configured to determine whether there is a backup port taking a failed port as a master port, and when it is determined that there is such a backup port, trigger the processing unit 43;

the processing unit 43 is configured to change said backup port to a master port; and the processing unit 43 is further configured to, after said backup port is changed to a master port, set the state of the master port to a forwarding state.

As a preferred embodiment of the disclosure, the detection unit 41 is specifically configured to, when it is detected that a failure occurs on a port of the STP-based device, record a port ID of the failed port.

The determination unit 42 is specifically configured to traverse ports of the device to perform determination on each port:

specifically, it is determined whether in a port priority vector of the device there is a port having a specified port field, i.e., port_ID that is the same as a recorded port_ID of the failed port, and when it is determined that there is such a port, the port having a specified port field port_ID that is the same as the recorded port ID is determined as a backup port taking the failed port as a master port; and the number of backup ports taking the failed port as a master port is acquired;

when it is determined that there is one such backup port, the backup port is determined as the only backup port taking the failed port as a master port and the processing unit 43 is triggered;

when it is determined that there are multiple such backup ports, the determination unit 42 selects a backup port having a highest priority as a backup port of the failed port and triggers the processing unit 43.

In practical applications, the detection unit 41, the determination unit 42 and the processing unit 43 can all be implemented by a Central Processing unit (CPU), a Digital Signal Processor (DSP) or a Field Programmable Gate Array (FPGA); and the CPU, DSP, FPGA are built in an STP-based device that may be located on the network side.

The specific implementation process of the device according to the disclosure will be omitted since it has been explained in the description of the corresponding method.

To sum up, the embodiments of the disclosure provide a fast recovery method and device for an STP-based backup port, it can be seen from the technical solutions provided by above embodiments that since a device receives message information through a port and the device can detect whether there is a failure on its port, such information can be used to reduce recovery time of the backup port without leading to a loop; the technical solutions provided by the embodiments of the disclosure can significantly shorten recovery time of the backup port, and improve greatly performance of link recovery provided by the backup port during a link backup scenario.

What described above are merely preferred embodiments of the disclosure, but the scope of protection of the disclosure is not limited thereto, any changes or substitutions easily made by those skilled in the art without departing from the technical scope disclosed herein should fall within the scope of protection of the disclosure. Therefore, the scope of protection of the disclosure should be defined as set forth in the following claims.

The invention claimed is:

1. A fast recovery method for a Spanning Tree Protocol (STP) based backup port, the method comprising:
   detecting that a failure occurs on a port of an STP-based device; and
   determining whether there is a backup port taking a failed port as a master port, and when it is determined that there is such a backup port, changing said backup port to a master port;
   the method further comprising: after said backup port is changed to the master port, setting a state of the master port to a forwarding state; wherein before said backup port is changed to the master port, a state of said backup port is a blocked state; and
   when it is detected that a failure occurs on a port of an STP-based device, recording a port Identity (ID) of a failed port;
   wherein the determining whether there is a backup port taking a failed port as a master port comprises: determining whether in a port priority vector there is a port having a specified port field, i.e., port ID that is the same as the ID of the failed port, and when it is determined that there is such a port, determining said port as the backup port taking the failed port as a master port.

2. The fast recovery method for an STP-based backup port according to claim 1, further comprising:
   determining whether there is one or multiple backup ports taking the failed port as a master port; and
   when it is determined that there are multiple such backup ports, selecting a backup port having a highest priority as a backup port of the failed port.

3. A fast recovery device for an STP-based backup port, the device comprising:
   a detection unit configured to, when detecting that a failure occurs on a port of an STP-based device, trigger a determination unit;
   the determination unit configured to determine whether there is a backup port taking a failed port as a master port, and when it is determined that there is such a backup port, trigger a processing unit; and
   the processing unit configured to change said backup port to a master port;
   wherein the processing unit is further configured to, after said backup port is changed to the master port, set a state of the master port to a forwarding state; and wherein before said backup port is changed to the master port, a state of said backup port is a blocked state;
   wherein the detection unit is further configured to, when detecting that a failure occurs on a port of an STP-based device, record a port Identity (ID) of a failed port; and
   the determination unit is configured to: determine whether in a port priority vector there is a port having a specified port field, i.e., port ID that is the same as the ID of the failed port, and when it is determined that there is such a port, determine said port as the backup port taking the failed port as a master port and trigger the processing unit.

4. The fast recovery device for an STP-based backup port according to claim 3, wherein the determination unit is further configured to determine whether there is one or multiple backup ports taking the failed port as a master port, and
   when it is determined that there are multiple such backup ports, select a backup port having a highest priority as a backup port of the failed port and trigger the processing unit.

* * * * *